United States Patent [19]
Cutler et al.

[11] 3,799,319
[45] Mar. 26, 1974

[54] ARTICLE ALIGNING APPARATUS

[75] Inventors: James F. Cutler; Wesley R. Maxted; Edward C. Soderstrom, all of Grand Rapids, Mich.

[73] Assignee: Rapistan, Incorporated, Grand Rapids, Mich.

[22] Filed: Apr. 27, 1972

[21] Appl. No.: 248,301

[52] U.S. Cl. ............................... 198/29, 214/11 R
[51] Int. Cl. ...................... B65g 47/22, B65g 47/34
[58] Field of Search ......... 214/11 R; 198/29, 79, 80

[56] References Cited
UNITED STATES PATENTS

| | | | |
|---|---|---|---|
| 1,290,862 | 1/1919 | Adderson | 198/29 |
| 1,579,545 | 4/1926 | Langsdorf | 198/79 |
| 2,969,866 | 1/1961 | Musgrave | 198/29 |
| 3,029,923 | 4/1962 | Bilocg | 198/29 |
| 3,034,634 | 5/1962 | Brand et al. | 214/11 R X |
| 3,523,618 | 8/1970 | Nielsen | 214/11 R |
| 3,470,997 | 10/1969 | Trounce | 198/29 |
| 3,491,903 | 1/1970 | Hedrick et al. | 214/11 R |

*Primary Examiner*—Robert G. Sheridan
*Assistant Examiner*—R. B. Johnson
*Attorney, Agent, or Firm*—Price, Heneveld, Huizenga & Cooper

[57] ABSTRACT

An induction apparatus includes a pair of induction stations having input ends coupled to feed conveyors for transferring articles to the induction stations. Each station includes an induction line extending between an input conveyor and a sorting conveyor and intersecting the sorting conveyor at an acute angle. The induction line of each induction station includes a powered conveyor, an indexing station and a variable speed feed conveyor controlled to induct cartons onto predetermined trays of the sorting conveyor in a synchronous manner. Aligning means are provided for finally aligning cartons on the trays once they are inducted thereon.

6 Claims, 9 Drawing Figures

ARTICLE ALIGNING APPARATUS

BACKGROUND OF THE INVENTION

The present invention relates to article handling apparatus for inducting articles from one conveyor to another conveyor in a synchronous fashion.

In modern high speed article transferring installations, it is necessary to sort articles for shipment and divert the sorted articles to predetermined areas for shipment. A relatively high speed sorting system has been developed and is described in detail in U. S. Pat. No. 3,034,665 to R. L. Speaker entitled CONVEYOR SYSTEM, issued May 15, 1962. In this system, a plurality of tray assemblies are mounted on an oval drive mechanism to form a closed loop conveyor. Each tray is tiltable such that as a carton placed on the tray passes a predetermined output chute adjacent the conveyor loop, the tray can be mechanically tilted thereby dumping the carton into the output chute which communicates with a desired loading dock or other area to which the carton is to be delivered for shipment.

In such a sorting system, it is necessary to position cartons due for shipment to various different locations rapidly onto trays such that a tray, assignable to a predetermined destination output chute, will have a carton placed thereon whose destination corresponds to the output chute position on the sorting conveyor where the tray is tilted. Due to the relatively high speed of operation of the sorting conveyor, it is practically impossible to manually position cartons on the trays or to properly position the cartons on the trays such that they will be discharged properly from the tray and onto the output chute. It is necessary, therefore, to provide automatic induction means for feeding predetermined cartons onto predetermined trays such that the cartons will be transferred to the desired output chute by the sorting conveyor.

One system which has been devised to automatically induct cartons onto a sorting conveyor is described in U. S. Pat. No. 3,491,903 to R. R. Hendrick, et al., entitled *INDUCTION SCHEME AND AUTOMATIC LOADER*, issued on Jan. 27, 1970. The system described in this patent is structurally different than that of the present system and does not incorporate an indexing stop or provide controlled variable speed induction means for accurately placing different length cartons on a tray assembly of the sorting conveyor. In the prior system, there is no means provided for positioning a carton in a predetermined location on the tray as does the apparatus incorporated as one feature in the present system.

SUMMARY OF THE INVENTION

The apparatus of the present invention employs a relatively high speed induction line which receives cartons from a feed conveyor and moves the cartons along the induction line through singulating means such as an indexing station. A destination code on the carton is read and utilized to program the sorting conveyor control to discharge the carton at an output chute adjacent the sorting conveyor and corresponding to the desired dispatch area for the carton. A variable speed feed conveyor receives singulated cartons and inducts the cartons in a synchronous manner onto predetermined locations on the sorting conveyor. Detection means are positioned to detect cartons on the feed conveyor and the position of oncoming areas of the sorting conveyor upon which the carton is to be inducted. Control means receive information from the detectors and control the speed of the feed conveyor to induct a carton onto the desired location of the sorting conveyor.

It is an object of the present invention to provide an improved induction station having an indexing station and a single variable speed feed conveyor for inducting cartons from an input conveyor onto a sorting conveyor.

It is an additional object of the present invention to provide an induction station with detection means for determining the size of a carton as well as the position of the carton while on the induction station.

It is still a further object of the present invention to provide an article handling system including a sorting conveyor and an induction system, each with detectors for determining the relative position of a tray on the sorting conveyor as it approaches the discharge end of the induction station and the position of a carton on the induction station such that the carton can be positioned on the tray of the sorting conveyor as it passes the induction station.

Another object of the present invention is to provide aligning means for aligning a carton on a tray of a sorting conveyor once the carton has been inducted onto the tray.

These and other objects of the present invention will become apparent upon reading the following specification together with the accompanying drawings.

BRIEF DESCRIPTION OF THE DRAWINGS

FIG. 2A is a perspective view of a portion of the sorting conveyor and one of the induction stations shown in FIG. 1 and constructed in accordance with the present invention;

DETAILED DESCRIPTION OF THE PREFERRED EMBODIMENT

Figure 1:
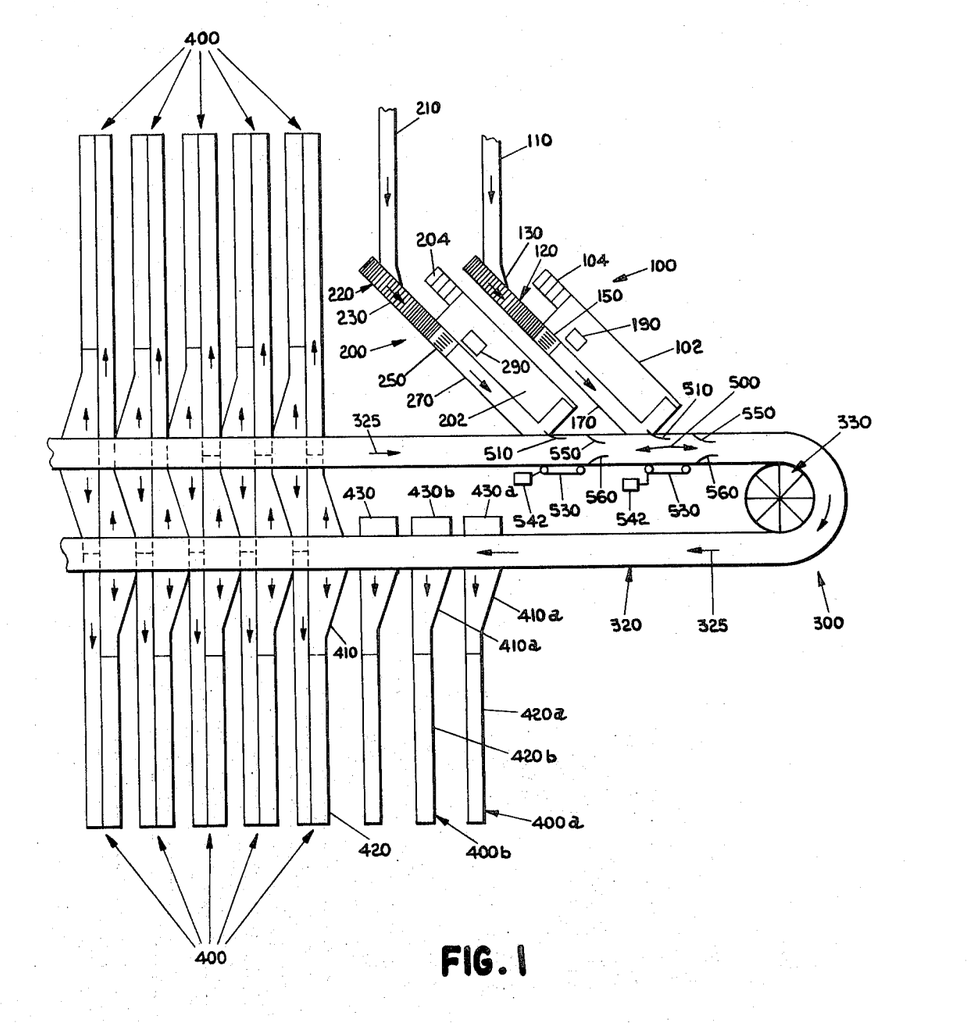
FIG. 1 is a plan schematic view of a system embodying the present invention.

Referring now to FIG. 1 in detail, there is shown a first induction station indicated generally at 100 and a second parallelly aligned induction station indicated generally at 200. The induction stations 100 and 200 transfer cartons, boxes or other articles from in-feed conveyors 110 and 210 respectively to a sorting conveyor 300. The induction stations each include an operator platform 102 and 202 with access stairs 104 and 204 respectively. Induction lines 120 and 220 of the induction stations 100 and 200 respectively comprise powered input conveyors 130 and 230, powered indexing stops 150 and 250; and variable speed output feed conveyors 170 and 270 respectively. Placed on each of the operating platforms is an operator control station 190 and 290, each of which include a data keyboard for providing destination code information to the sorting conveyor control for each carton that is inducted onto the sorting conveyor 300 via one of the induction stations.

The right end of a sorting conveyor 300 is shown in FIG. 1. The conveyor 300 comprises an endless loop system with a plurality of spaced tray assemblies (not shown in FIG. 1) for receiving articles from one of the induction stations as a sorting conveyor tray passes thereby. The tray carries the article around the conveyor loop to a predetermined discharge area where the tray is tilted to discharge the article therefrom. The sorting conveyor is described in greater detail in U. S. Pat. No. 3,034,665 to R. L. Speaker. Basically, the conveyor 300 comprises a movable conveyor drive which is rotatably driven between a pair of end hubs 330 (the right end hub being shown in FIG. 1). A tray will pass the induction stations moving in a direction indicated by the arrows 325 associated with the conveyor; pick up a carton discharged from one of the induction stations; and continue around the hub 330 to a plurality of discharge or output chutes 400.

Each of the chutes 400 includes a relatively wide carton receiving mouth portion 410 which is placed adjacent the edge of the conveyor 320 at each discharge station such that as a conveyor tray passes the discharge station, an actuatable trigger mechanism 430 (only three being shown in block form in FIG. 1 for the sake of clarity), the tray will be tilted thereby (as described in detail in the above-identified patent) to discharge a carton onto the mouth 410 of the output chute. A discharge slide 420 communicates with the mouth 410 of each chute to dispatch cartons in a direction indicated by the arrows. Slides 420 may be gravitational fed inclined slides, roller conveyors, or other powered conveyors of suitable design.

As seen in FIG. 1, the output chutes 400 are positioned in an interleaved fashion such that each tray discharging station has an output chute communicating with opposite sides of the conveyor. The opposite leg of the endless loop conveyor 300 likewise has spaced discharge stations with outlet chutes communicating with either side thereof. The interleaved chute and slide arrangement shown in FIG. 1 provides a maximum number of output chutes for a given length of the sorting conveyor. With such an arrangement, a plurality of the slides 420 associated with each of the chutes can be used to feed cartons to a single dispatching station for the accumulation of large numbers of articles or cartons which are to be sent to a single destination. Likewise, the output slides 420 can be arranged to provide a plurality of destinations, one corresponding to each of the output chutes 400, when requirements necessitate the shipment of only a few articles to a plurality of different destination points. As will be described in greater detail below, the first two output chutes indicated by the suffixes a and b respectively provide outputs for cartons which have an erroneous key location, i.e., a non-existing tray tilting position for which there is no trigger mechanism 430 or no discharge location information programmed for the carton when it is inducted onto the sorting conveyor, i.e., when a carton received at the induction station does not have a visible destination code thereon.

Aligning means 500 for positioning cartons placed on the trays of the sorting conveyor 300 are provided for each of the induction stations 100 and 200. The aligning means include a first guide finger 510 which extends inwardly toward the center of the sorting conveyor and is positioned at the discharge end of each of the induction stations adjacent the sorting conveyor. A movable aligning member 530 is positioned in approximate alignment with finger 510 across the sorting conveyor therefrom. Finally, the aligning means 500 includes a pair of second aligning fingers 550 and 560 projecting inwardly from either side of the conveyor 300. The operation of the aligning means will be described in detail together with the detailed description of one of the identical induction stations which follows.

Referring now to FIGS. 2A through 5, it is seen that each induction station comprises a support bed 122 comprising a pair of parallel horizontal support members 124 and 126 supported by a plurality of legs 125 which extend between the members 124 and 126 and the floor of the sorting facility. The components of the induction line 120 are supported by the bed 122 at a height which is suitable for inducting cartons onto the trays 340 of the sorting conveyor which is likewise supported by horizontal support members 324 and 326 held above the floor level of the facility by means of a plurality of spaced vertical legs 325.

The input end of the induction line 120 comprises a powered roller conveyor 130 (a portion of which is shown in FIG. 2A), that communicates with the in-feed conveyor 110 (shown in FIG. 1). Roller conveyor 130 can be powered in any conventional manner to transport articles such as cartons 600 from the in-feed conveyor to the vertically movable, powered indexing station 150.

Figures 2, 2B:
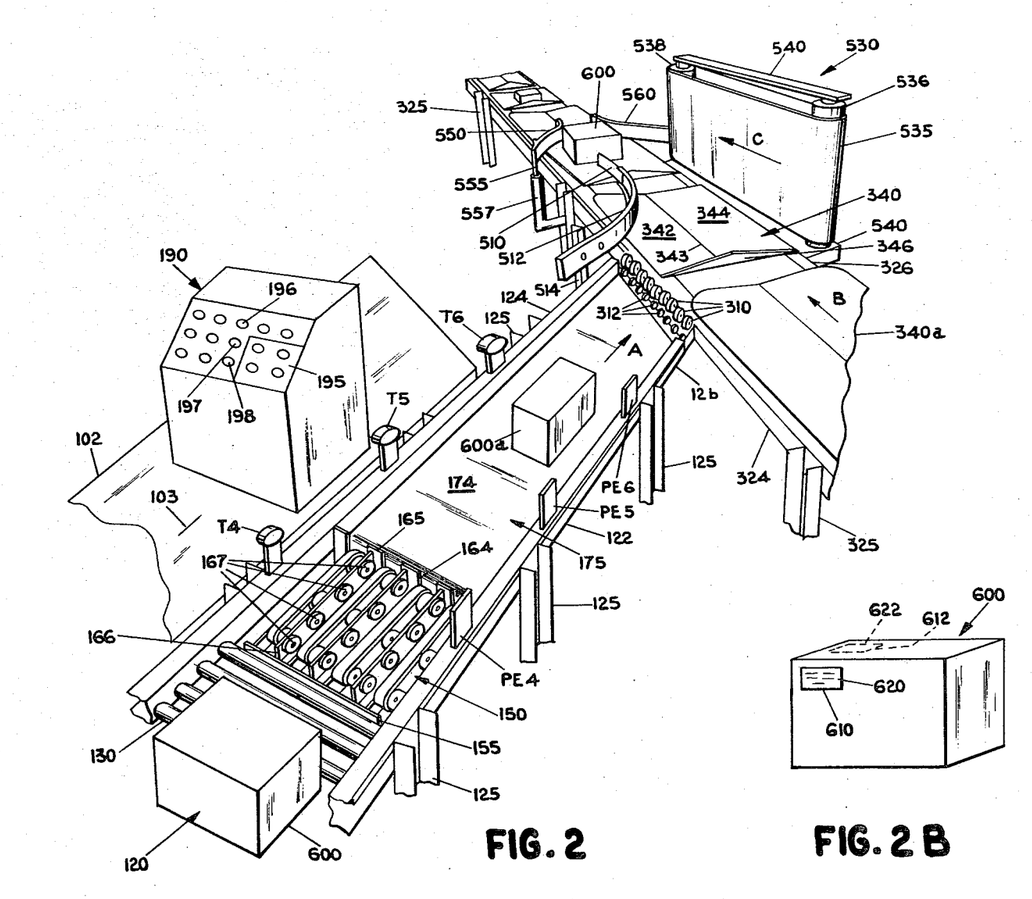
FIG. 2B is an enlarged perspective view of a carton showing visible destination indicia thereon.
Figures 3, 6:
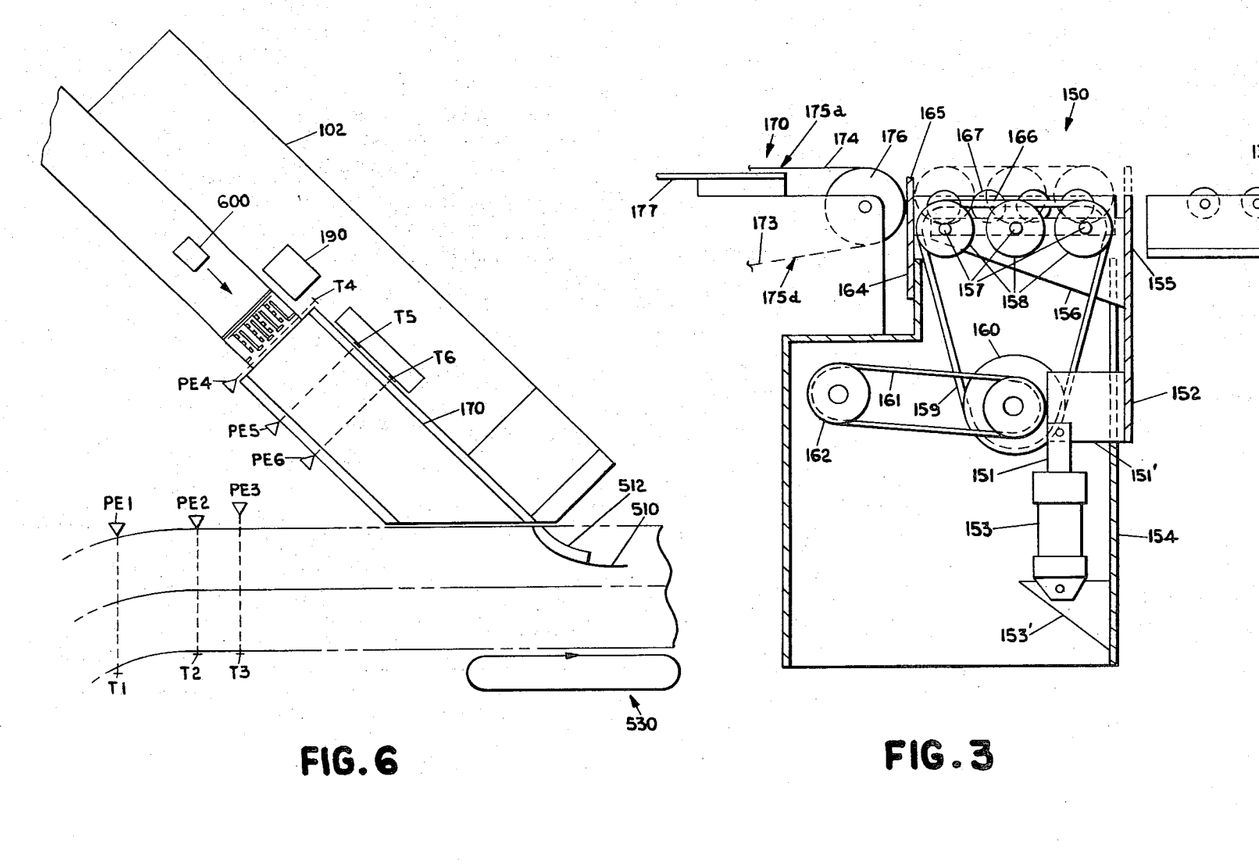
FIG. 3 is a detailed side elevation view partially in cross section of a powered indexing stop employed in the induction station.
FIG. 6 is a plan schematic view of an induction station of the present invention and an upstream portion of the sorting conveyor showing the positioning of various detectors on the induction station and on the sorting conveyor.

As seen in FIGS. 2A and 3, the carton singulating means comprises an indexing station 150 with a vertically movable carriage assembly 152 slidably coupled to a fixed framework 154. A pneumatic cylinder 153 has one end coupled to the frame 154 by means of a suitable bracket 153' attached to frame 154. The shaft 151 of cylinder 153 is coupled to bracket 151' mounted to the rear wall 155 of carriage 152. The rear wall 155 is positioned adjacent the powered input conveyor 130 as shown. Four spaced brackets 156 are fixedly mounted to the inner surface of the rear wall 155 and extend forwardly to support three axles 157 therebetween. Twelve V-belt pulleys 158 (three on each of the four brackets 156) are rotatably mounted to brackets.

Four V-belts 159 extend over the pulleys 158 and around a speed reducing pulley 160 which is coupled to a drive motor 162 by means of a drive belt 161. The outer surfaces of the V-belts 159 supported by the pulleys 158 provide a movable surface for transporting cartons from the indexing stop over the top edge 165 of a fixed notched forward wall 164 attached to frame 154 when the carriage assembly 152 is in its raised position as indicated in dashed lines in FIG. 3.

The indexing station 150 further includes a plurality of members 166 comprising flat elongated plates which are positioned between the V-belt and pulleys 158 and secured to the front plate 164 as shown in FIG. 2. The longitudinally extending plates 165 have rollers 167 spaced therealong which extend slightly above the members 166 to contact cartons. When the carriage 152 and movable V-belts 159 are in the lowered position shown in solid lines in FIG. 3, a carton can pass over the lowered rear wall 155 and be driven by the input conveyor 130 against the fixed front plate 164 which extends above the top of rollers 167 to stop the carton at the indexing station.

Each carton 600 includes an area 610 (FIG. 2B) on which is placed visible destination indicia 620 which can be read by an operator standing at position 103 on the operator platform 102 when the carton is momentarily at rest at the indexing station 150. The indicia may take the form of numerals, letters, colors, or other suitable indicia and could be positioned on the top surface of the carton 600 as indicated by the dashed line area 612 with indicia 622 thereon. While the carton is at rest at the indexing station, the operator reads the destination information and keys this data into the control system for the sorting conveyor by means of a data keyboard 195 within the operator control station 190. The operating console 190 includes various other controls such as power on-off switches and control switches 196-198 which will be described below together with the description of the operation of the system.

Whether or not the operator properly programs the destination information into the control system, the carriage assembly 152 of the indexing station 150 is automatically raised as described below by the actuation of cylinder 153. The support arms 156 are moved upwardly which in turn raises the V-belt pulleys 158 and moving V-belts thereon until the outer surfaces of the V-belts 159 contact the bottom surface of the carton which is propelled thereby from station 150 onto the feed conveyor 170.

Figure 4:
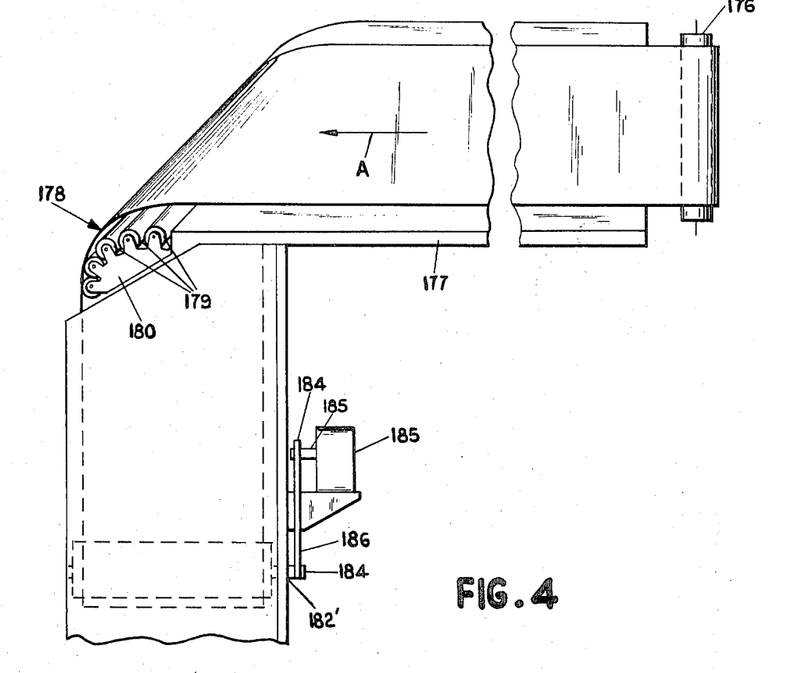
FIG. 4 is a detailed plan view of a variable speed, endless loop, feed conveyor employed in the induction station shown in FIG. 2.
Figure 5:
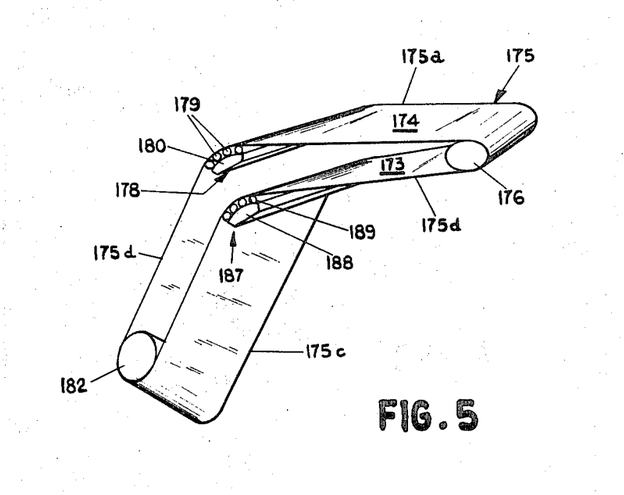
FIG. 5 is a perspective schematic view of the threading arrangement of the endless loop belt employed with the feed conveyor shown in FIG. 4.

The feed conveyor 170 comprises an endless belt 175 having an outer surface 174 and an inner surface 173. The detailed threading of the belt 175 to form the endless loop feed conveyor 170 is shown in FIGS. 3,4 and 5. As seen in these figures, a first section 175a of the belt 175 extends between a roller 176 adjacent and parallel to the front plate 164 of station 150 at the input end of the feed conveyor and a skewed guide 178 at the discharge end of the feed conveyor 175. A plate 177 is positioned under segment 175a to provide support thereto. The skewed guide 178 includes a plurality of rollers 179 rotatably mounted to a block 180 which is positioned at approximately a 45° angle to the direction of travel of the section 175a of the belt 175 as shown by the direction of arrow A. Rollers 179 engage the inner surfaces 173 of belt 175 to provide a smooth transition for the direction change of the belt.

A section 175b of the endless belt 175 extends from the skewed guide 178 to an end roller 182 which is positioned somewhat below the level of roller 176 and at an angle such that a section 175c of the belt can be returned between roller 182 and a second skewed guide 187 having a plurality of rollers 189 rotatably mounted to a base member 188. The final section 175d of the belt 175 is then strung between the second skewed guide 187 and the input roller 176 to complete the feed conveyor loop.

Belt 175 is driven by means of a variable speed motor 185 coupled to the end roller 182 by means of a drive chain 186 and suitable sprockets 184 on the shaft 185' of motor 185 and the shaft 182' of roller 182. By providing an endless loop feed belt having a 45° angle at its discharge end, the induction of the cartons 600 onto the sorting conveyor is facilitated and relatively rapid. The transfer from conveyor 170 to a tray 340 of the sorting conveyor is synchronized by varying the speed of the belt 175 such that the carton 600 leaves the discharge end of the conveyor at a time which coincides with the presence of a tray at the discharge end of the induction station. As seen in FIG. 2A, the gap between the discharge edge of conveyor belt 175 and the edge of the sorting conveyor 300 is filled by means of a plurality of rollers 310 and 312 which have different diameters and which are interleaved to provide a continuous and smooth transfer of a carton from the feed conveyor onto the sorting conveyor.

As seen in FIG. 2A, the sorting conveyor includes a plurality of trays 340, each having downwardly sloping surfaces 342 and 344 which join along a center line 343 of the tray to form the carton carrying surface of each tray. The rear edge 346 of each tray is turned upwardly as shown in the figure. Each tray is interconnected to the remaining trays at predetermined spaced intervals and transported along the conveyor bed in an oval path shown in part in FIG. 1 by means of suitable drive means such as an endless loop drive chain which, as explained briefly above, extends around drive hubs at either end of the oval sorting conveyor. In some installations, the drive chain can reach lengths of over 2,000 feet. The overall length of the chain can vary several feet due to stretching during use or temperature variations. Such changes adversely affect the discharge of cartons onto the discharge chutes (400 in FIG. 1). To compensate for the varying drive chain length, a compensating control can be provided to insure cartons are properly dispatched from conveyor 300.

As a carton leaves the indexing station 150, it is propelled toward the discharge end of the induction line 120 by the feed conveyor 170. A typical carton 600a (FIG. 2A) is shown traveling in a direction indicated by the arrow A toward the sorting conveyor such that it will be transferred onto the oncoming sorting tray 340a shown moving along on the conveyor in a direction indicated by the arrow B. Once carton 600a is primarily positioned on the tray 340a by the induction station, the aligning means 500 provides secondary positioning of the carton on the tray.

Guide finger 510 forming a portion of the aligning means is made of a stiffly springable material coupled to a curved arm 512 anchored at one end to a post 514 such that the finger 510 extends over the sorting conveyor. As the tray 340a passes finger 510, the finger contacts the carton 600a and forces it against the movable aligning member 530 which comprises a continuously rotating, vertically oriented endless loop belt 535 coupled between a pair of rollers 536 and 538 which are suitably mounted to a frame 540. The moving belt 535 is driven by means of a drive motor 542 shown schematically in FIG. 1 which has a shaft coupled to one of the rollers 536 or 538. Frame 540 is placed parallel to and adjacent the horizontal support member 326 of the sorting conveyor and across from finger 510 as shown in FIGS. 1 and 2A. Finger 510 forces the carton against the moving belt 535 (traveling in a direction indicated by the arrow C) thereby rotating the carton to an aligned position generally parallel to the motion of the sorting conveyor.

As the carton 600a on a tray 340a moves to a position downstream from the induction station, a pair of second guide fingers 550 and 560 contact the leading edge of the carton. As the tray passes therethrough, the carton is shifted against the rear edge 346 of the tray. Each of the fingers 550 and 560 are mounted to a post 555 which, in turn, is mounted within a receiving member 557 which includes spring loading means tending to hold the curved guide fingers 550 and 560 toward the center of the sorting conveyor. As a carton is shifted against the edge 346 of the tray, the fingers swing outwardly against the spring tension to slide along the opposite sides of the carton thereby holding the carton in a centered, aligned position on the tray as it passes between the fingers. Once the tray moves downstream from the aligning fingers 550 and 560, it is located centrally and rearwardly on the tray. This positioning of the cartons on the trays permits accurate discharge of the cartons from the trays as they are tilted to one side or the other of the sorting conveyor during discharge therefrom allowing the carton to slide off the sloped surfaces of the tray and onto the discharge chutes 400 (FIG. 1).

Having described the structure and function of the various components making up each of the induction stations and the sorting conveyor, a description of the operation of the system to automatically induct cartons onto the sorting conveyor is now presented.

OPERATION

The operation of the system can best be understood by referring to FIGS. 2A, 6, 7 and 8 which show the various detectors and their relative positions along one of the induction stations and sorting conveyor as well as the control circuits employed to automatically induct cartons onto the sorting conveyor. The detectors employed to sense the position of cartons on the induction line and trays on the sorting conveyor are photoelectric detecting units. Each unit comprises a light source and a light detecting device such as a photocell positioned on one side of the sorting conveyor or the induction station, and a reflective target placed across the induction station or conveyor. The detecting units are indicated by the symbols PE while the targets are indicated by the symbol T. Detecting units and their corresponding targets have the same subscript numeral.

Figure 7:
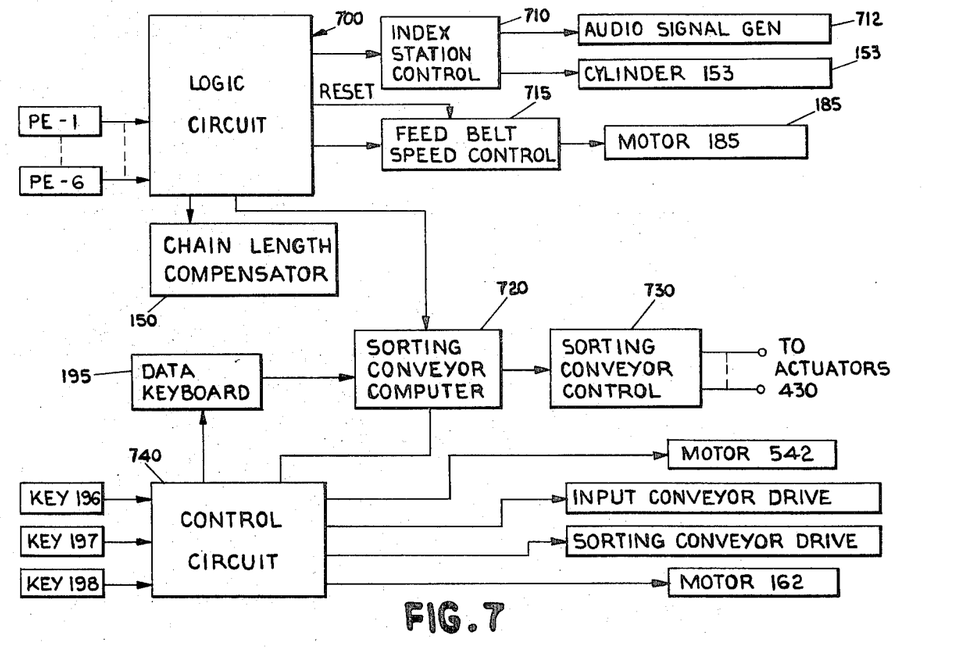
FIG. 7 is an electrical circuit diagram in block form showing the electrical control circuit of the present invention.

Initially, it is noted that the sorting conveyor moves at a relatively constant speed whereas the cartons entering the induction station from the in-feed conveyor arrive randomly and have different lengths. Thus, it is necessary to separate bunches of arriving cartons, i.e., singulate them, and synchronize the induction of the different sized cartons with the motion of the sorting conveyor such that they properly arrive at a tray, i.e., reference edge of the carton is placed in relation to a reference point on a tray, of the sorting conveyor which is moving past the discharge end of the induction station. To provide the desired synchronization, it is necessary to compensate for drive speed variations that may exist with the sorting conveyor as well as other position changes of the trays on the sorting conveyors. The latter difficulty arises since the conveyor is commonly driven by an endless loop chain which can be several hundred feet long and whose total length may vary several feet due to stretching and/or contraction or expansion due to temperature variations. To provide accurate information as to the actual position of the tray on the sorting conveyor, a plurality of photoelectric detecting units labeled 1 through 3 are provided upstream of each of the induction stations as indicated in FIG. 6. Likewise, photoelectric detecting units 4,5 and 6 are positioned on each induction station to provide carton length and position information to the control system. The various control circuits for the induction station and sorting conveyor are shown in FIG. 7.

Each of the photoelectric detectors PE-1 through 6 have output terminals which are coupled to inputs of a logic circuit 700. Circuit 700 comprises conventional logic circuit elements such as AND gates, OR gates and combinations of similar logic circuit elements to provide control signals to an index station control circuit 710, a feed belt speed control circuit 715, and a sorting conveyor computer 720. Circuit 700 also can provide tray position information to a chain length compensator control 750.

The operation of logic circuit 700 is described below in conjunction with the description of the logic diagram of FIG. 8. The index station control 710 is coupled to a cylinder 153 to provide signals thereto which actuate cylinder 153 to operate the indexing station. Circuit 710 is also coupled to an audio signal generator 712 as well as to the sorting conveyor computer 720 via line 717. The feed belt speed control circuit 715 is coupled to the drive motor 185 which controls the speed of the feed belt 175 on the feed conveyor 170 (FIG. 2).

Data keyboard 195 on the control console 190 (FIGS. 1 and 6) can be a conventional electrical data keyboard having 10 numerical keys which provides three digit carton destination information, i.e., the address, to the sorting conveyor computer 720 when actuated by the operator. The output of the sorting conveyor computer 720 is coupled to a sorting conveyor control 730 which is coupled to each of the actuators 430 to tilt predetermined trays on the sorting conveyor when they are aligned with the actuation stations corresponding to predetermined desired output chutes. The sorting conveyor computer, sorting conveyor control, and actuators 720, 730, and 430 respectively; can be of the type described in greater detail in U.S. Pat. No. 3,034,665.

Keyboard 195 includes a send key 196 which is actuated by the operator after the three digit data is entered into the keyboard to allow the computer 720 to read the carton destination data when an induction signal is also received. A last carton key 197 is also provided and is actuated by the operator when the last carton of the series of cartons enters the induction station. This control can be employed to erase the address for cartons of the completed shipment and replace the old address with that of an oncoming shipment after the last carton is diverted and the chute location is available for a new shipment.

Finally, a look-up key 198 is provided and is actuated by the operator when a carton enters the induction station with no discernible destination code thereon. It is recalled here that the induction station will automatically induct every carton which enters the induction station onto an empty tray of the sorting conveyor regardless of whether or not any of the proper destination code is entered into the sorting conveyor computer. This design, which maximizes the efficiency of the system, necessitates the use of the look-up key 198 as well as the look-up chute 400a and the miskey chute 400b shown in FIG. 1. The operation of this facet of the system will be described in greater detail below.

In addition to the data keyboard, control console 190 includes various switches coupled to a control circuit 740 which apply power to the drive motor 542 for the movable aligning means 530, the input conveyor drive mechanism for the input conveyor 130 of the induction station, the sorting conveyor drive motor, and the drive motor 162 which continuously drives the V-belts 159 of the indexing station (FIG. 3).

For the purpose of discussing the operation of the system, a description of a single induction station will be presented, it being understood that the pair of induction stations 100 and 200 shown in FIG. 1 are controlled such that alternate spaced trays on the sorting conveyor 300 are employed with each of the induction stations. Thus, odd numbered trays are employed with only the induction station 100 while even numbered trays are employed only with the induction station 200. Referring now to FIGS. 6 through 8, as a carton 600 enters the induction station from the in-feed conveyor, it is forced against the forward wall 164 (FIG. 3) of the indexing station by powered conveyor 130 since the carriage assembly 152 of the indexing station is normally in the lowered position. The carton in this position interrupts the light beam between PE-4 and its target T-4. This information (carton present at indexing station) is employed as one condition precedent to actuating the indexing station to induct the carton as indicated by decisional block 804 of FIG. 8. During the period of time that a carton is at rest at the indexing station, a tray on the sorting conveyor will be passing the general area covered by the detector PE-1 and its associated target T-1.

PE-1 and T-1 are positioned to direct a beam of light slightly above the surface of the trays passing along the sorting conveyor to detect whether or not the trays are empty. The signal from PE-1 is fed to logic circuit 700 and provides information for the decisional block 800 of the logic diagram 8. PE-1 and its targets are positioned relative to the discharge end of the induction station such that the carton at the indexing station can be inducted onto an empty tray passing PE-1 once the tray reaches the discharge end of the induction station. If the tray, however, has a carton thereon, the induction will be inhibited as indicated by decisional block 802.

When PE-1 detects an empty tray, the logic circuit 700 is conditioned to actuate the indexing station control upon the further receipt of a signal from the second photoelectric detector and target combination PE-2, T-2 concurrently with a signal from PE-4 indicating a carton is present at the indexing station. It is noted that the remaining photoelectric detectors PE-2 and PE-3 are directed to impinge upon the surface of the tray thereby detecting the existence of a tray rather than a carton on one of the trays. PE-2, T-2 are positioned with respect to the discharge end of the induction station such that for the known sorting conveyor speed, a nominal sized carton will be inducted onto the empty tray when the feed conveyor 170 is running at a nominal speed.

Upon the receipt of the signal from the second photoelectric detector PE-2, the decisional block 804 which corresponds to suitable logic circuitry within circuit 700, makes the decision to induct the carton at the indexing station. It is noted here that while the carton is at rest at the indexing station (approximately two seconds in one installation), the operator keys the carton destination information on keyboard 195 and actuates the send key 196 or last carton key 197 to transmit the data to the computer 720. If no destination code is on the carton, the operator actuates the look-up key 198. If the induction was inhibited due to a full tray, the destination information which has already been entered on the keyboard by the operator, who is not aware of the loaded status of the tray, is not read by the sorting conveyor computer as indicated by the decisional block 810. The computer reads the destination information (or address) for the tray only when the induct signal has actually been generated. In the event that an empty tray has an address on it as it enters an induction area, and induction is inhibited due to the absence of a carton at the indexing station or because the tray is associated with the other induction station, the old address is cleared from the computer memory as indicated by decisional block 806. This feature prevents an empty tray from not being fully utilized in the system. Although the destination information is operator read, it is possible to provide machine readable indicia and suitable sensing means to provide the function of the operator automatically.

Figure 8:
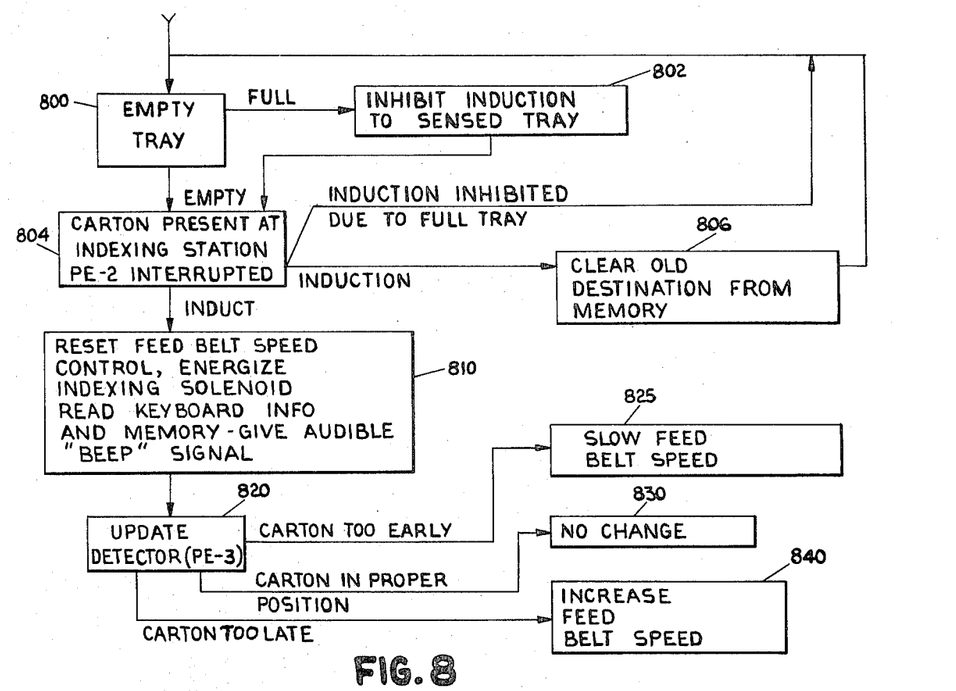
FIG. 8 is a logic diagram in block form illustrating the operation of the control system of the present invention.

Once the decision to induct a carton has been made, the logic circuit 700 provides a variety of control signals to perform the functions indicated by the block 810 of FIG. 8. First, the feed belt speed control circuit 715 is reset so that it can properly induct the carton. The indexing solenoid 153 is energized to raise the powered V-belts of the indexing station. A signal is applied to the sorting conveyor computer 720 to actuate it to read the keyboard information which the operator has typed on the data keyboard. The audio signal generator 712 is actuated to develop an audible tone to signal the operator to begin keying destination information for the next arrived carton. These various control effects are triggered by the sensing of a carton at the indexing station by PE-4 together with the simultaneous passing of the trailing edge of the empty tray past the photoelectric cell PE-2. It is noted here that the trailing edges of the trays and cartons are used as the reference point for the detectors (with the exception of PE-4) since they are the boundaries which must be positioned relative to one another for induction.

As the tray passes PE-3, the feed belt speed control circuit 715 is actuated to provide corrective speed control signals to the motor 185 of the moving conveyor belt 175 as necessary to insure that the carton will be properly inducted onto the oncoming empty tray.

In most installations, carton sizes being inducted can be divided into three size ranges, long, nominal and short. The trailing edges of short cartons will tend to arrive at the discharge end of the induction station too early when the conveyor speed 170 is at a nominal setting. Long cartons, on the other hand, tend to arrive too late to be properly positioned on a passing tray. Photodetectors PE-5 and PE-6 are spaced along the feed conveyor to detect the length of a carton thereon and its relative position at the moment the empty tray actuates PE-3. By properly positioning and spacing detectors PE-5, PE-6 and PE-3 therefore, it is possible to develop control signals to slow down, speed up or not change the speed of conveyor 170.

The operation of these sensors is illustrated in the logic diagram of FIG. 8 by the blocks 820 through 840. If, for example, a short carton is passing through the induction station, neither photoelectric detectors PE-5 or 6 will be interrupted indicating that the trailing edge of the carton is arriving at the discharge end of the induction station too early. A signal is developed by the logic circuit 700 to reduce the speed of the feed belt conveyor. For nominal sized cartons, when the feed belt conveyor is moving at its nominal speed, the trailing edge of the carton will be positioned between detectors 5 and 6 such that only detector 6 will be actuated and the belt speed is not changed. Finally, if a long carton is being inducted or if, for some reason, a carton is transferred from the indexing station to the feed conveyor in a delayed manner, either both of the photodetectors 5 and 6 will be actuated or only the photodetector 5 will be actuated thereby indicating that the carton will arrive too late at the discharge end of the induction station. Under this condition, a signal is developed by the logic circuit to cause the feed belt conveyor to increase its speed for proper induction. In one installation, the cartons being inducted were of three standard sizes and the feed belt conveyor was operable at three discrete speeds for proper induction of each carton length. In other installations, it may be necessary and desirable to provide a continuous speed control and additional detectors for varying the speed of the feed conveyor as necessary for proper induction onto a tray of the sorting conveyor system.

As indicated above, if a carton is present at the indexing station, it will be inducted onto an empty tray even though the operator has not read the destination code or transferred the destination information to the sorting conveyor computer. When a carton on the indexing station has no discernible destination information, the operator will actuate the look-up key 198 which causes a signal to be coupled to the computer 720 which, in turn, causes the actuator 430b to actuate upon the aligned arrival of this particular tray on which this carton is inducted thereby emptying the carton into a look-up bin associated with the discharge chute 400b.

On the other hand, if an erroneous destination code has been typed into the computer by the operator and no such destination location exists for the system, or if no code is entered, the carton will automatically be discharged into the discharge chute 400a corresponding to miskeyed trays.

It will become apparent to those skilled in the art that various modifications to the present induction system can be made, both to the physical structure of the components of the induction station and sorting conveyor, as well as to the control thereof without departing from the spirit or the scope of the present invention as defined by the appended claims.

What is claimed is:

1. A system for transferring articles comprising:
    an in-feed conveyor for receiving articles;
    a sorting conveyor having a plurality of spaced discrete article carrying locations moving at a relatively constant speed;
    transfer conveyor means coupled to said in-feed conveyor for receiving articles therefrom and extending to said sorting conveyor at an acute angle therebetween for selectively transferring an article onto an article carrying location of said sorting conveyor;
    first aligning means positioned adjacent said sorting conveyor for contacting said article once on said article carrying location, said first aligning means including a movable member positioned adjacent one side of said sorting conveyor and means positioned on an opposite side of said sorting conveyor for urging an article into engagement with said movable member to rotate said article into a predetermined orientation on said article carrying location; and second aligning means positioned adjacent said sorting conveyor and spaced down stream from said first aligning means to engage said article when located on said article carrying location for translating said article to a predetermined position on said article carrying location.

2. The apparatus as defined in claim 1 wherein said transfer conveyor includes an indexing station adapted to momentarily stop an article as it travels between said in-feed conveyor to said sorting conveyor, and control means for actuating said indexing station to synchronize movement of an article on said transfer conveyor with the movement of article carrying locations on said sorting conveyor to effect transfer of an article onto an article carrying location.

3. In a material handling system including an induction station for inducting randomly received articles onto a sorting conveyor having movable article carrying trays at predetermined spaced locations along the sorting conveyor, said trays including an upwardly projecting rear edge; aligning means for positioning an article on the article carrying trays of the sorting conveyor in alignment against said rear edge comprising:

a movable aligning member positioned adjacent said conveyor above said article carrying trays such that an article positioned on a tray can contact said movable member to be rotated thereby,
    a first guide finger extending into the line of travel of said article carrying trays, spaced above said trays, and positioned in alignment with said movable aligning member across said sorting conveyor therefrom to force an article against said movable aligning member, and
    a pair of inwardly projecting second guide fingers located downstream said sorting conveyor from said first guide finger and extending inwardly over said article carrying trays of said sorting conveyor to contact an article thereon and force an article on a tray rearwardly against said projecting edge of said tray as it passes said second guide fingers.

4. The apparatus as defined in claim 3 wherein said movable aligning member comprises:
    an endless belt,
    a pair of vertically oriented guide rollers spaced to receive said endless belt thereover, and
    drive means for moving said endless belt over said guide rollers.

5. The apparatus as defined in claim 4 wherein said first guide member comprises a springable member,
    an arm coupled to said springable member and mounted in fixed relationship to said sorting conveyors in a position such that said springable member contacts an article on a tray as it passes between said first guide finger and said movable aligning member to force the article against said movable aligning member due to the spring tension of said springable member.

6. The apparatus as defined in claim 5 wherein said second guide fingers include bias means for holding said guide fingers in an inwardly projecting position and which allows the fingers to swing outwardly once an article has contacted the projecting edge of a tray passing between said second guide fingers.

* * * * *